US009418165B2

(12) United States Patent
Fitzpatrick

(10) Patent No.: US 9,418,165 B2
(45) Date of Patent: Aug. 16, 2016

(54) CONTEXT RECOGNITION THROUGH SCREENSHARING

(76) Inventor: Michael Fitzpatrick, Hillsborough, CA (US)

(*) Notice: Subject to any disclaimer, the term of this patent is extended or adjusted under 35 U.S.C. 154(b) by 1693 days.

(21) Appl. No.: 11/929,523

(22) Filed: Oct. 30, 2007

(65) Prior Publication Data
US 2014/0033049 A1 Jan. 30, 2014

(51) Int. Cl.
| G06F 17/30 | (2006.01) |
| G06F 9/44 | (2006.01) |
| G06Q 30/02 | (2012.01) |
| H04L 12/18 | (2006.01) |
| G06F 3/0481 | (2013.01) |

(52) U.S. Cl.
CPC ........ *G06F 17/30873* (2013.01); *G06F 9/4445* (2013.01); *G06F 3/0481* (2013.01); *G06Q 30/0251* (2013.01); *H04L 12/1818* (2013.01); *H04L 12/1822* (2013.01)

(58) Field of Classification Search
CPC .................................................. G06F 9/4445
USPC .................. 715/730, 733, 751, 753
See application file for complete search history.

(56) References Cited

U.S. PATENT DOCUMENTS

| 5,948,061 | A | 9/1999 | Merriman et al. |
| 2006/0082581 | A1* | 4/2006 | Schmieder et al. ........... 345/501 |
| 2006/0179453 | A1* | 8/2006 | Kadie .................... G06Q 30/02 725/34 |
| 2008/0148160 | A1* | 6/2008 | Holmes et al. ................ 715/758 |
| 2008/0209021 | A1* | 8/2008 | Shamma ....................... 709/223 |
| 2008/0222283 | A1* | 9/2008 | Ertugrul et al. .............. 709/224 |

* cited by examiner

*Primary Examiner* — Tuyetlien T Tran
*Assistant Examiner* — David S Posigian
(74) *Attorney, Agent, or Firm* — Shook, Hardy & Bacon L.L.P.

(57) ABSTRACT

A method and a system for contextual recognition through screen-sharing are provided. Example embodiments may include receiving a data stream related to a presenter screen in a network-based collaboration session from a first user; extracting characteristic data from the data stream; associating added data with the data stream, based on the data; and presenting, in real time, to a second user, a viewer screen including the data stream and the added data. The method may also include recognizing the characteristic data before the extracting of the data.

23 Claims, 7 Drawing Sheets

CONTEXT RECOGNITION THROUGH SCREENSHARING

TECHNICAL FIELD

Example embodiments relate generally to the technical field of networking, and in one specific example, to a system for context recognition through screen sharing.

BRIEF DESCRIPTION OF THE DRAWINGS

Some embodiments are illustrated by way of example and not limitation in the figures of the accompanying drawings in which.

DETAILED DESCRIPTION

Figure 1:
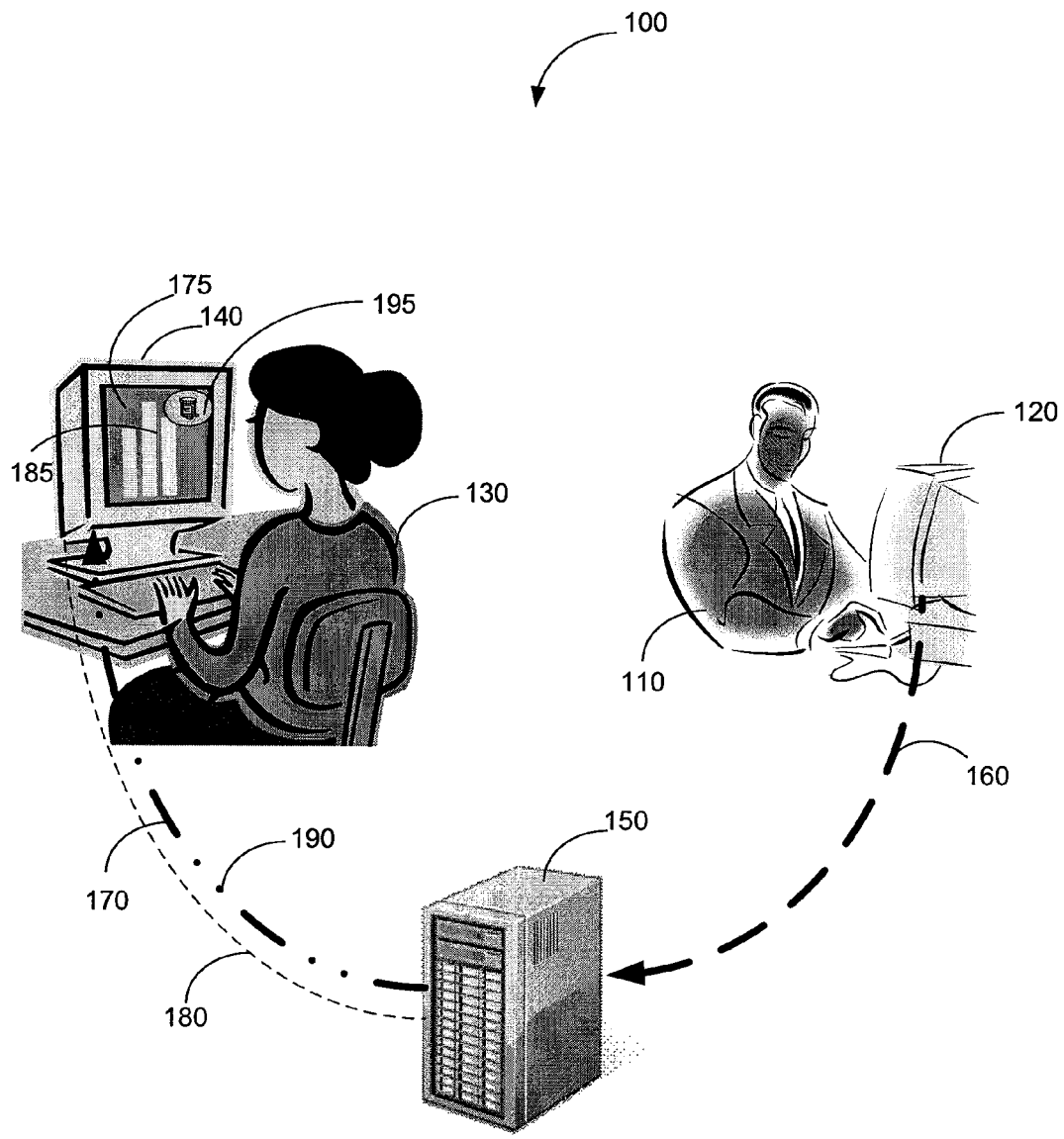
FIG. 1 is a high-level diagram depicting an example embodiment of a system for contextual recognition through screen sharing and added data incorporation.

Example methods and systems for contextual recognition through screen-sharing have been described. In the following description, for purposes of explanation, numerous specific details are set forth to provide a thorough understanding of example embodiments. It will be evident, however, to one skilled in the art that the present invention may be practiced without these specific details.

The widespread use of the Internet and networking has provided a unique and powerful opportunity for many new and useful ideas to be realized. Screen sharing is one of those ideas that empower a user to transmit the content of his/her computer screen to one or more remotely connected Internet users. Today, there are many screen sharing tools available and these tools are widely used in collaboration sessions, online meetings, and seminars (Webinar) (e.g., GOTOMEETING, GOTOWEBINAR, and GOTOASSIST, Web-hosted services created by CITRIX ONLINE of Santa Barbara Calif., and MEETMENAW MEETMENOW provided by WEBEX COMMUNICATION Inc. a CISCO SYSTEMS Inc. company of San Jose, Calif., and the like).

Terminal multiplexer software such as GNU Screen (GNU stands for GNU's Not Unix, GNU Screen was developed by GNU Project) allow users to access multiple separate terminal sessions inside a single terminal window or remote terminal session, therefore facilitate screen sharing.

The Internet has also become an increasingly popular way of delivering advertisements such as targeted advertisement. In this type of advertising, the presentation of advertisements may be tied to particular user behaviors and/or user profiles, and/or user demographics. Such user behaviors may include user access to a particular Web page, user selection (e.g., mouse-clicking or clicking) of a particular location on a Web page, user entry of a particular search string or keyword, etc.

To target advertising accurately, advertisers or vendors pay to have their advertisements presented in response to certain kinds of events—that is, their advertisements are presented when particular user behaviors warrant such presentation. If a particular advertisement (ad) leads to some user action, an advertiser may receive remuneration for the advertisement.

For the purpose of present application, the term "incorporate in" shall also be taken to include, but not be limited to, "provide with."

Some embodiments described herein may include enabling a first user at a first client machine to present a screen to be shared with a second user at a second client machine. The shared screen, once displayed to the second user at the second client machine, may include contextual advertisements selected based on characteristic data extracted from a data stream communicated from the first client machine to the second client machine. Companies in the business of developing and/or marketing screen sharing tools may leverage the new technology to incorporate contextual advertisements into screen shared files exclusively for customers who desire to have free access to the tools in exchange for watching contextual advertisements during screen sharing sessions.

An example method may include receiving a data stream related to a presenter screen in a network-based collaboration session from a first user; extracting characteristic data (e.g., content data and/or metadata) from the data stream and associating added data (e.g., contextual advertisements) with the data stream, based on the data; and presenting, in real time, to a second user, a viewer screen including the data stream and the added data.

Example embodiments may include receiving of the presenter screen data stream related to the presenter screen currently displayed on a display device of the first client machine and recognizing the characteristic data including recognizing various components of the data stream, such as a text, an image, an audio or a video stream, before the extracting of the data. The first and second client machines may include desktop computers, laptops, Personal Data Assistants (PDA), cellular phones, set-top boxes (STP) or the like.

According to example embodiments, extracting the characteristic data and including the added data may be carried out at the first client machine. The recognizing of the characteristic data may include recognizing a keyword, the keyword to be used in identifying the added data. The added data may include a contextual advertisement, selected based on the recognized keyword. The added data may be embedded in a location within the data stream proximate to the keyword.

In an example embodiment, a server may receive the data stream, recognize characteristic data, extract characteristic data, and include the added data with the stream data at the server.

According to an example embodiment, presenting to the second user may take place at a second client machine used by the second user, whereat receiving of the data stream, recognizing the data, extracting the data, and associating the added data with the data stream may take place.

System Architectures

FIG. 1 is a high-level diagram depicting an example embodiment of a system 100 for contextual recognition through screen sharing and added data incorporation. The system 100 may include a first user 110, a first client machine 120, a server 150, a second user 130, and a second client machine 140. In a typical screen sharing session, the first user 110, using the first client machine 120, may prepare one or more presenter screens that he/she may want to share with one or more second users 130.

The presentation file in a form of a data stream 160 may be received by a server 150. The server 150 may recognize various components of the data stream 160 (e.g. text, image, audio, or video stream). The server 150 may also identify characteristic data including metadata and content data such as keywords and extract the characteristic data and based on the characteristic data (e.g. metadata, keywords, images, and audio and video contents) and incorporate added data 190 in the data stream 160 to form the mixed data stream 170 or alternatively include the added data as a parallel data stream 180.

In the same screen sharing session, at the second client machine 140, the second user 130 may see a viewer screen 175 including a shared portion 185 that replicates the presenter screen and an added data portion 195 that may include contextual advertisement.

Figure 2:
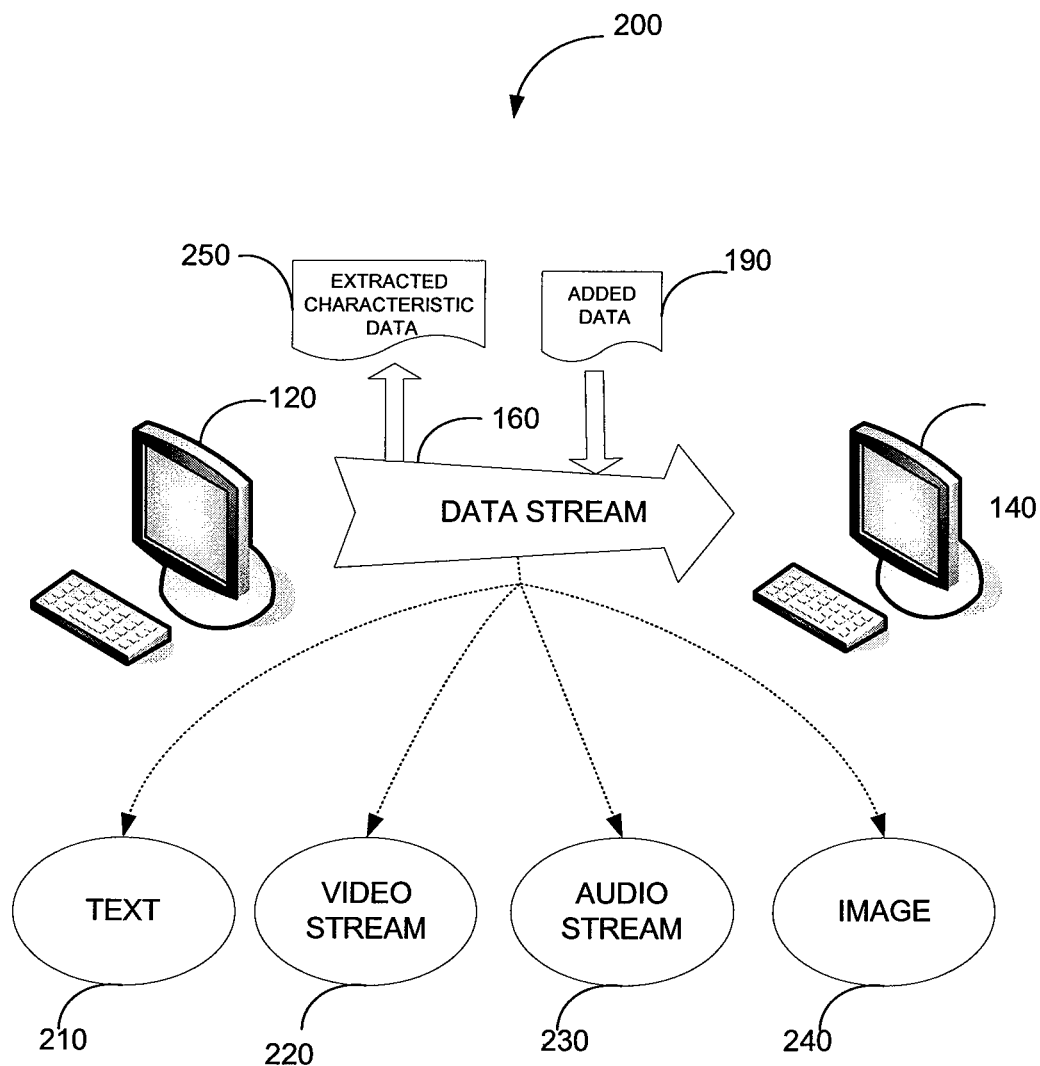
FIG. 2 is a high-level diagram illustrating an example embodiment of various components of data stream and extraction of characteristic data and incorporation of added data in a screen sharing session.

FIG. 2 is a high-level diagram 200 illustrating in an example embodiment of various components of data stream and extraction of characteristic data and incorporation of added data in a screen sharing session. The data stream 160 starting from the first client machine 120 and flowing into the second client machine 140 may include various components including text 210, video stream 220, audio stream 230, and image 240. Image 240 may include static pictures.

FIG. 2 also shows the extracted characteristic data 250 and the added data 190. The extracted characteristic data 250 may include metadata and content data such as keywords, images, audio, and video contents. The added data 190 (or the parallel data stream 180) may include contextual advertisements.

The characteristic data extraction and added data incorporation may be carried out at various locations. As an example embodiment, in the system of FIG. 1 as discussed before, these operations were completed in the server 150. Two other example embodiments are illustrated in FIG. 3, which shows in a diagrammatic representation the characteristic data extraction and added data incorporation at the first and the second client machines sharing a screen.

Figure 3:
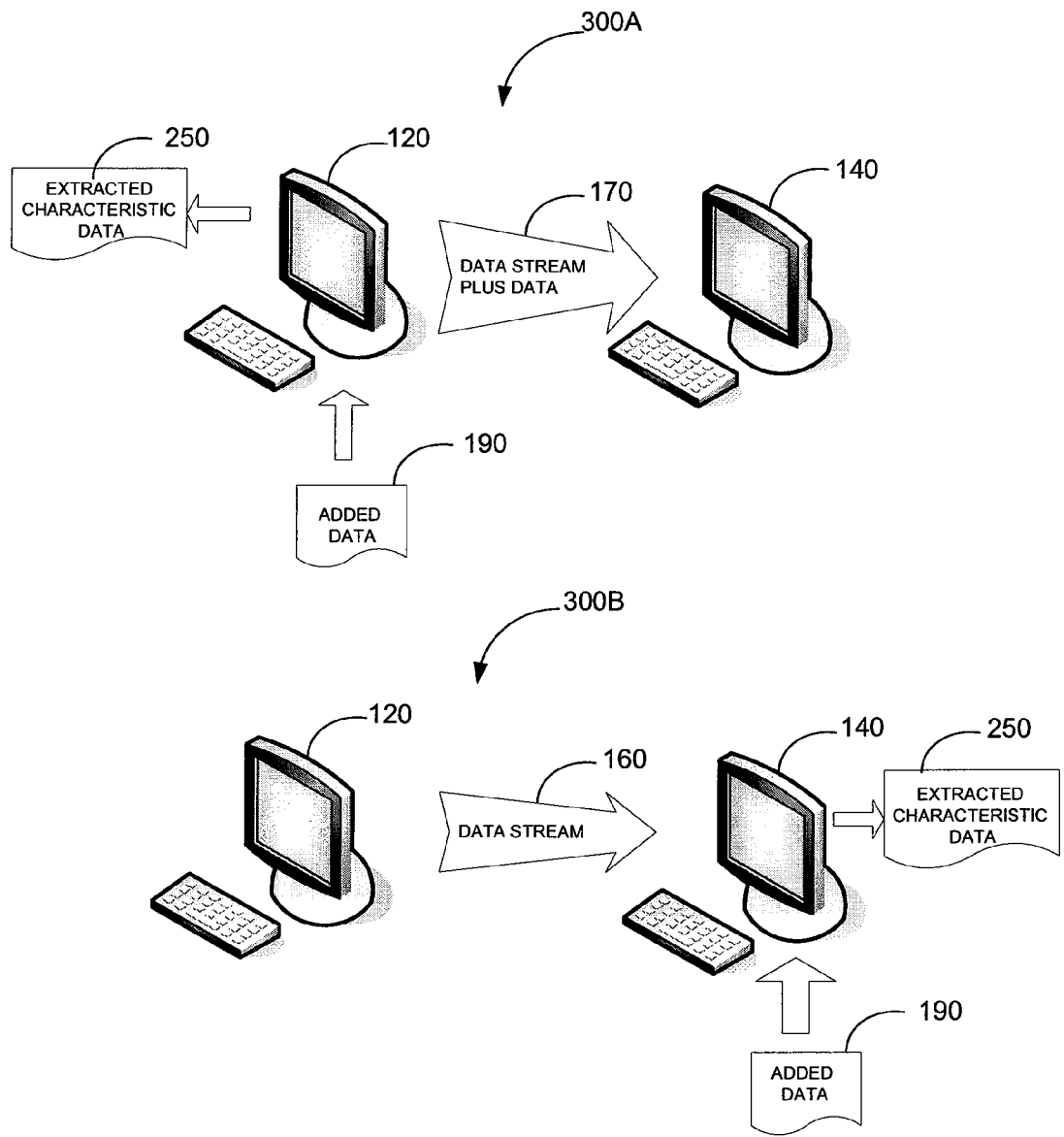
FIG. 3 is a block diagram illustrating example embodiments of extracting characteristic data and incorporating added data at first and second client machines sharing screens.

In the first embodiment shown in FIG. 3, the extracted characteristic data 250 may be scraped off the presenter screen data after recognition by the first client machine 120. Then the added data 190 (or the parallel data stream 180) may be incorporated with the data stream 160 to form the data stream 170 flowing into the second client machine 140. The first and the second client machines 120 and 140 may be connected through a network (e.g. the Internet or local area network (LAN)).

In an alternative example embodiment, the data stream 160, representing the presenter screens provided by the first user 110 at the first client machine 120, may flow into the second client machine 140, where the characteristic data may be recognized and extracted. The extracted characteristic data 250 may be scraped off the data stream 160 and the added data 190 (or the parallel data stream 180) may also be incorporated in the data stream 160 at the second client machine 140.

Figure 4:
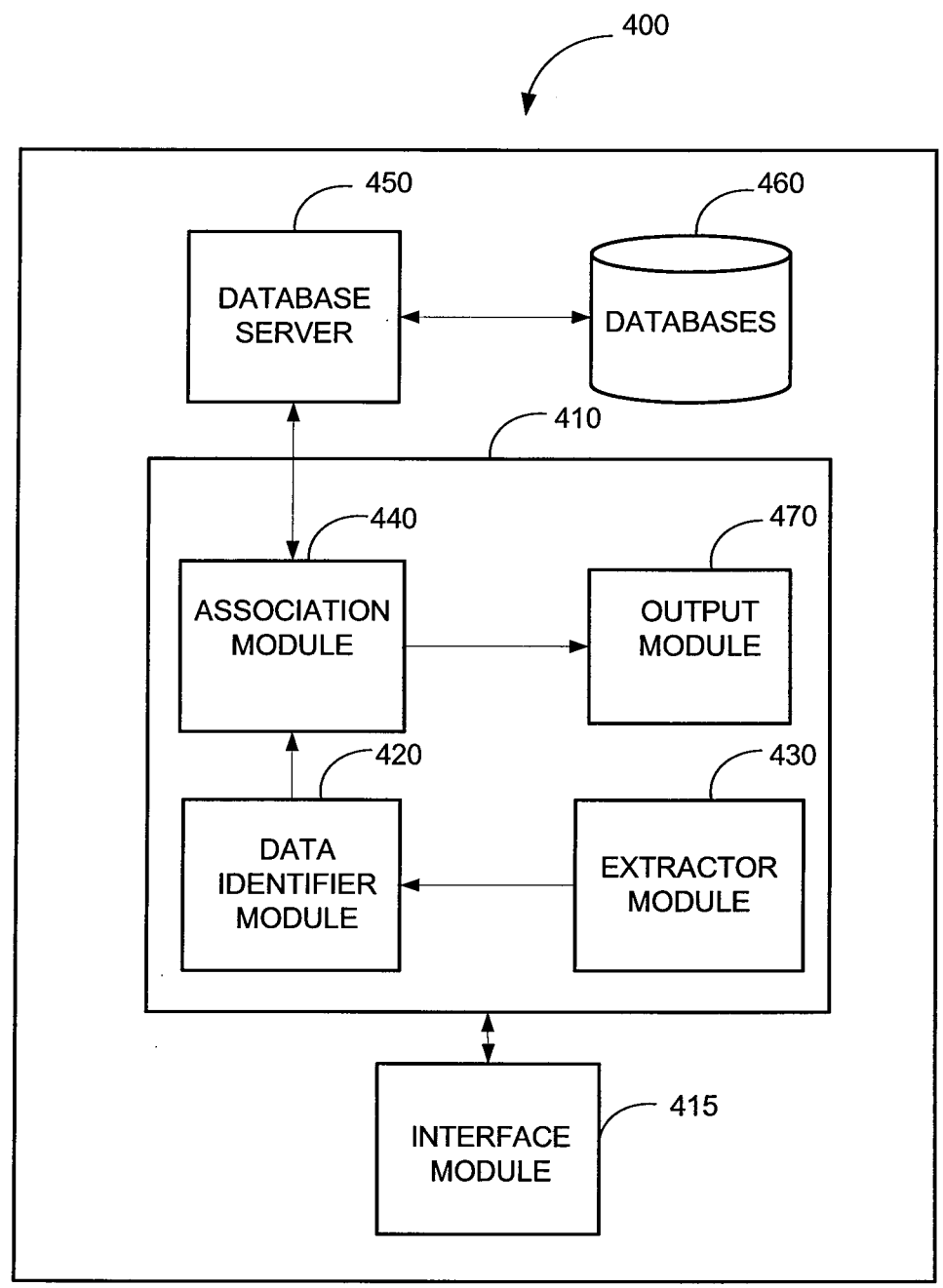
FIG. 4 is a block diagram depicting an example embodiment of a server including a processor for contextual characteristic data recognition and extraction and added data addition in a screen sharing session.

FIG. 4 is a block diagram depicting an example embodiment of a server 400 including a processor 410 for contextual characteristic data recognition and extraction and added data addition in a screen sharing session. In an example embodiment, the server 400 may include an interface module 415, databases 460, and a database server 450. The database server 450 may provide the processor 410 access to the databases 460. The interface module 415 may, for example, facilitate receiving data stream 160 from the first client machine 120 and/or sending data stream 170 to the second client machine 140 via a network (e.g., the Internet or LAN).

The processor 410 is responsible for recognition of characteristic data including metadata and content data, extraction of characteristic data and incorporation of added data 190 to the data stream 160 of FIG. 1. The processor 410 may include a data identifier module 420, an extractor module 430, a association module 440, and a output module 470.

The data identifier module 420 may recognize the characteristic data (e.g. metadata, keywords, images, audio, and video contents) using Optical Character Recognition (OCR) like technologies. The data identifier module 420 may be able to identify some keywords that could be used by the association module 440 to select and mix the appropriate added data 190 to the data stream 160.

The extractor module 430 may extract the identified characteristic data from the data stream 160 by the data identifier module 420 and pass the result to the association module 440. The extractor module 430 may, for example, act as a screen scraper that may be capable of extracting characteristic data from the display output of the first client machine 120. The screen scraper may be distinguishable from regular parsing in that the output being scraped may be intended for use by another display device for final display to another human being (e.g., second user 130), rather than input to another program.

The characteristic data extracted by the extractor module 430 may be passed to association module 440, where it may be used to identify appropriate added data 190, including contextual advertisements for incorporating in the data stream 160. The association module 440 may embed the added data into the data stream 160 (added data 190) or may provide it as a parallel data stream 180 with the data stream 160.

The association module 440 may search databases 460 using the keywords and/or other identifying characteristic data (e.g., static images, images in the video stream, words in the audio streams, etc.) provided by the data identifier module 420, for appropriate added data such as contextual advertisement. The association module 440 may then obtain the added data on the databases 460 by making access requests to the database server 450. The added data may be in the form of texts, images, video streams without/including audio, or audio streams used, for example, to broadcast contextual advertisements.

The mixed data stream may then be sent to the output module 470 for providing an output stream (e.g., data stream 170) with a format that may be displayed on the display devices of the second client machines 140 (e.g., desktop computer, laptop, PDA, cell phone, STP, etc.).

Flow Diagram

Figure 5:
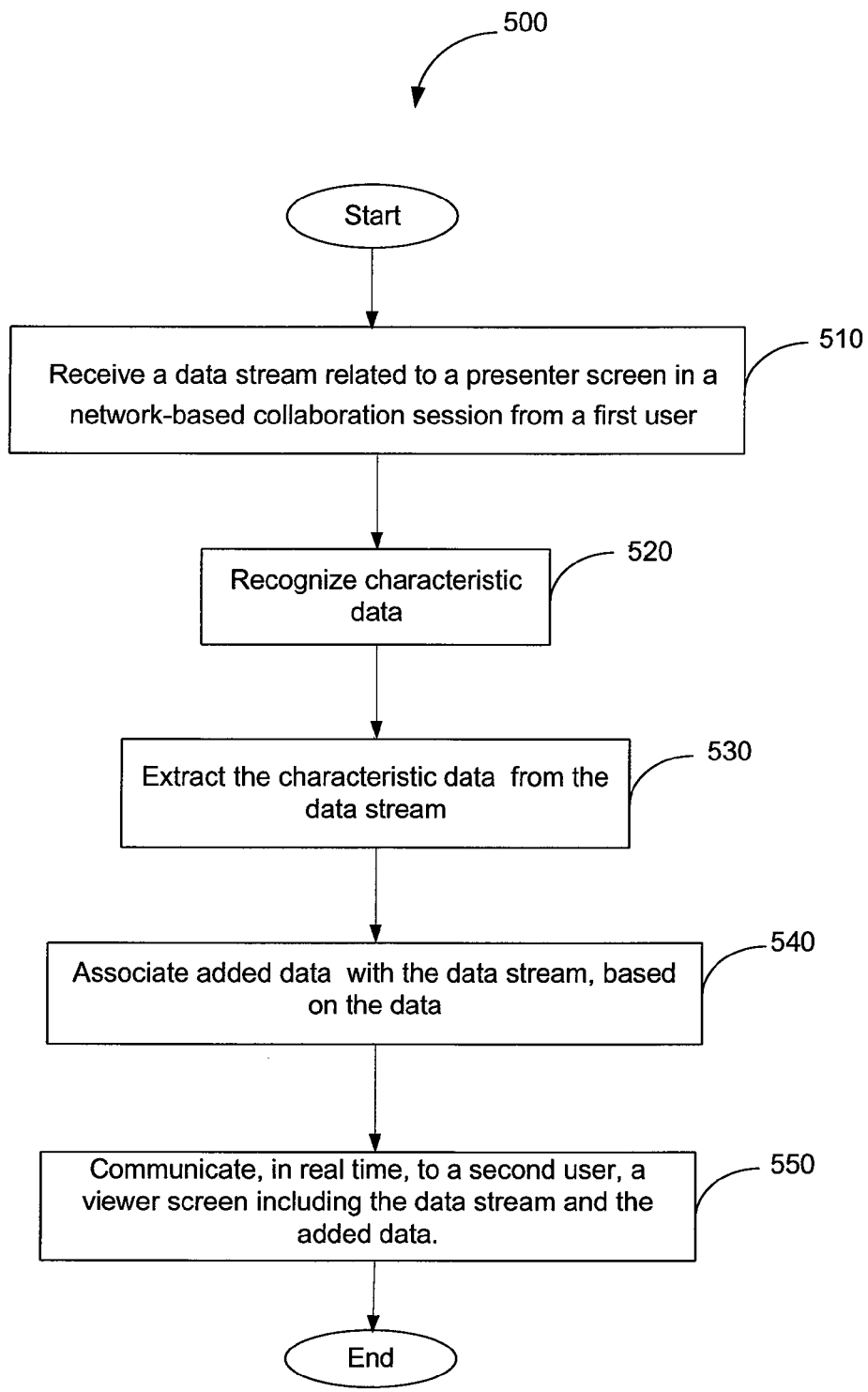
FIG. 5 is a flow diagram illustrating an example embodiment of a method for contextual characteristic data recognition and extraction and added data incorporation in a screen sharing session.

FIG. 5 is a flow diagram illustrating an example embodiment of a method 500 for contextual characteristic data recognition and extraction and added data incorporation in a screen sharing session. The method 500 starts at operation 510, where the server 400 may use the interface module 415 to receive the data stream 160 related to the presenter screen provided by the first user 110 to be shared with the second users 130 in a collaboration session.

The interface module 415 may pass the received data stream 160 to the identifier module 420 for the characteristic data (e.g. metadata, keywords, images, and audio and video contents) to be recognized (operation 520). At operation 530, the extractor module 430 may extract the characteristic data from the data stream 160. The extracted characteristic data 250 may be used by the association module 440 (operation 540) to associate the added data (e.g., contextual advertisements) with the data stream 160, based on the extracted characteristic data 250. As indicated before, the added data may be embedded into the data stream 160 (as added data 190), or provided in a parallel data stream 180 in conjunction with the data stream 160.

At operation 550, the output module 470 may provide an output stream (e.g., data stream 170) with a format that may be presented, in real time, as viewer screens to second users 130 and displayed on the display devices of the second client machines 140 (e.g., desktop computer, laptop, PDA, cell phone, STP, etc.).

Network-Based System

Figure 6:
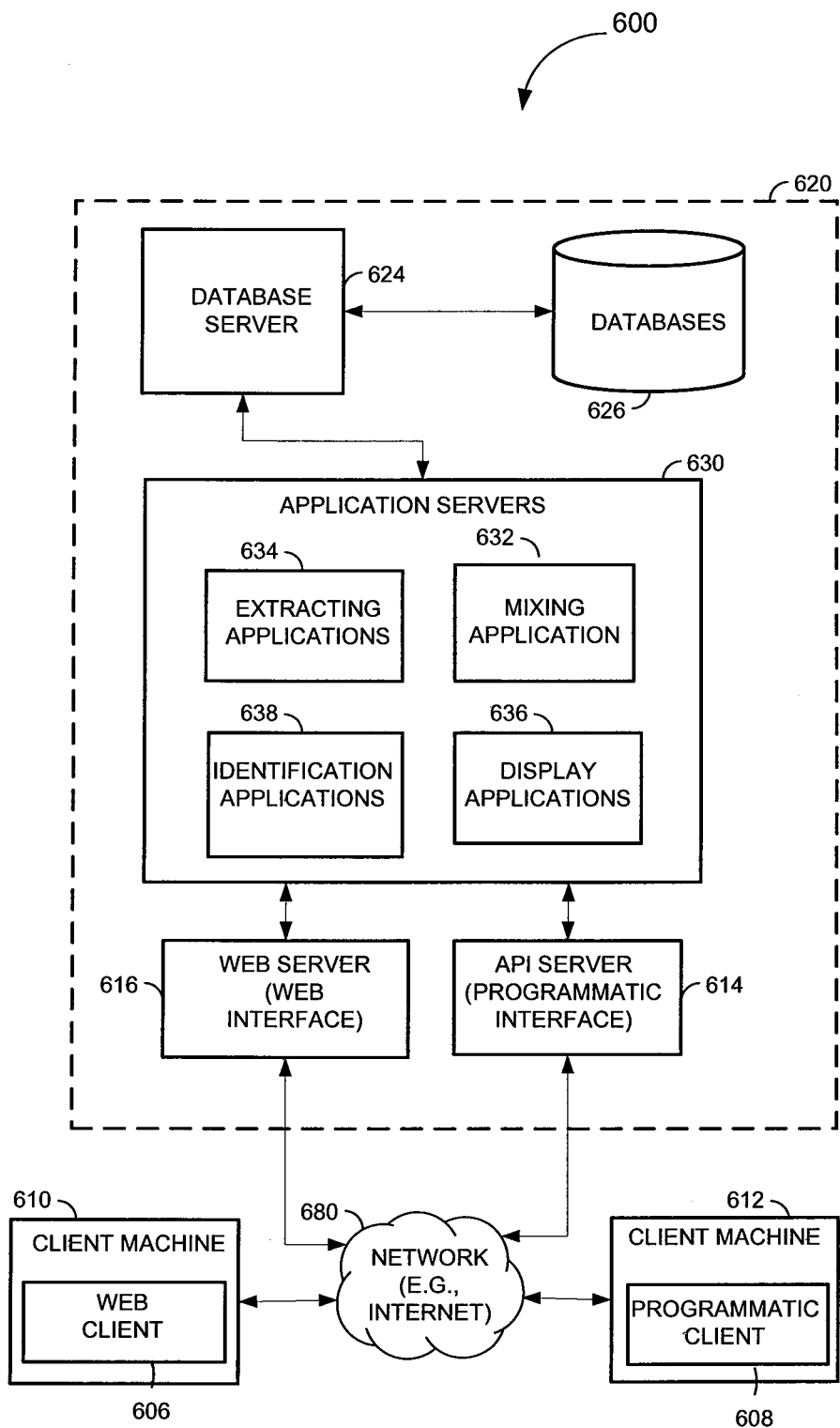
FIG. 6 is high-level block diagram illustrating an example embodiment of a network-based system having a client-server architecture facilitating screen sharing with characteristic data extraction, recognition and added data incorporation.

FIG. 6 is high-level block diagram illustrating an example embodiment of a network-based system 600, having a client-server architecture, facilitating screen sharing with characteristic data extraction, recognition, and added data incorporation. A screen sharing platform, in the example form of a network-based screen sharing system 620, provides server-side functionality, via a network 680 (e.g., the Internet) to one or more clients. FIG. 6 illustrates, for example, a Web client 606 (e.g., a browser, such as the Internet Explorer browser developed by Microsoft Corporation of Redmond, Wash.), and a programmatic client 608 executing on respective client machines 610 and 612. In an example embodiment, either or both the Web client 606 and programmatic client 608 may include a mobile device.

Turning specifically to the network-based screen sharing system 620, an Application Program Interface (API) server 614 and a Web server 616 are coupled to, and provide programmatic and Web interfaces respectively to, one or more application servers. The application servers 630 may host one or more extracting applications 634, identification applications 638, mixing applications 632, and display applications 636. The application servers 630 are, in turn, shown to be coupled to one or more database servers 624 that facilitate access to one or more databases 626.

The identification applications 638 may facilitate recognizing various components of the data stream 160, including text 210, image 240, audio 230, or video stream 220. The identification applications 638 may also be instrumental in recognizing characteristic data including metadata and content data such as keywords.

The extracting applications 634 may provide for extracting the recognized components, for example, the metadata and keywords from the text component 210 in order for the mixing applications 632 to mix appropriate added data 190 such as contextual advertisements. To find appropriate added data 190, the mixing applications 632 may search databases 626 based on the data, e.g., the keywords recognized by the identification application 638. The mixing applications may then use database server 624 to access databases 626 and obtain the added data 190 to mix with the data stream 160.

The display applications 636 may receive the mixed data stream from the mixing applications and process the mixed data stream to provide an output stream with a format that may be displayed on the display device of the client machines (e.g., desktop computer, laptop, PDA, cell phone, STP, etc.).

Further, while the system 600 shown in FIG. 6 employs a client-server architecture, the present application is of course not limited to such an architecture and could equally well find application in a distributed, or peer-to-peer, architecture system. The various extracting applications 634, identification applications 638, mixing applications 632, and display applications 636 may also be implemented as standalone software programs, which do not necessarily have networking capabilities.

The Web client 606 may access the extracting applications 634, identification applications 638, mixing applications 632, and display applications 636 via the Web interface supported by the Web server 616. Similarly, the programmatic client 608 accesses the various services and functions provided by the extracting applications 634, identification applications 638, mixing applications 632, and display applications 636 via the programmatic interface provided by the API server 614. The programmatic client 608 may, for example, be a GOTOMEETING application to enable a user using a first client machine to share a screen with another user using a remote client machine.

Machine Architecture

Figure 7:
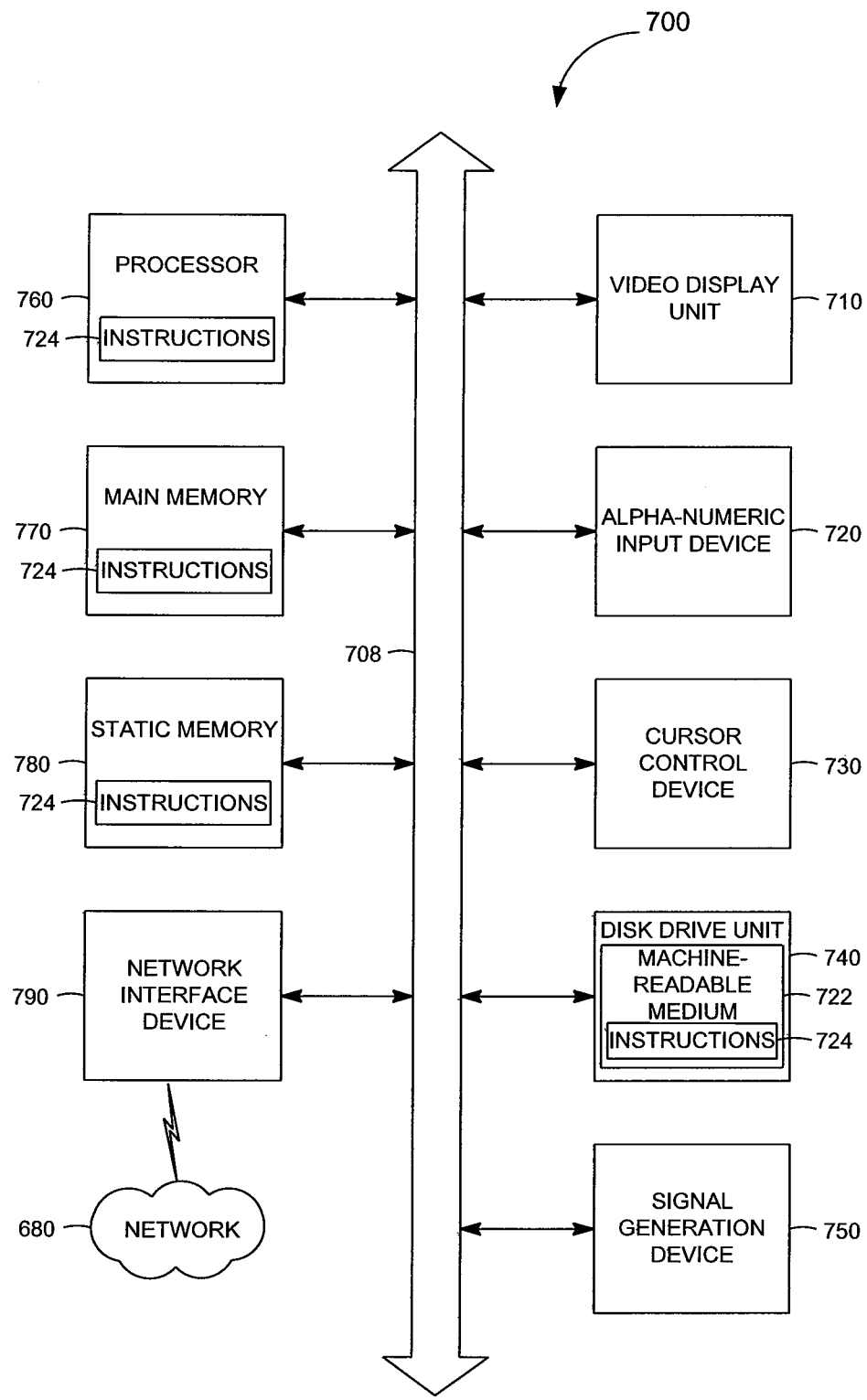
FIG. 7 is a block diagram illustrating a diagrammatic representation of a machine in the example form of a computer system.

FIG. 7 is a block diagram, illustrating a diagrammatic representation of machine 700 in the example form of a computer system within which a set of instructions for causing the machine to perform any one or more of the methodologies discussed herein may be executed. In alternative embodiments, the machine 700 may operate as a standalone device or may be connected (e.g., networked) to other machines. In a networked deployment, the machine 700 may operate in the capacity of a server or a client machine in a server-client network environment, or as a peer machine in a peer-to-peer (or distributed) network environment.

The machine 700 may be a server computer, a client computer, a personal computer (PC), a tablet PC, a STB, a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 760 (e.g., a central processing unit (CPU), a graphics processing unit (GPU) or both), a main memory 770 and a static memory 780, all of which communicate with each other via a bus 708. The computer system 700 may further include a video display unit 710 (e.g., liquid crystal displays (LCD) or cathode ray tube (CRT)). The computer system 700 also may include an alphanumeric input device 720 (e.g., a keyboard), a cursor control device 730 (e.g., a mouse), a disk drive unit 740, a signal generation device 750 (e.g., a speaker) and a network interface device 790.

The disk drive unit 740 may include a machine-readable medium 722 on which is stored one or more sets of instructions (e.g., software 724) embodying any one or more of the methodologies or functions described herein. The software 724 may also reside, completely or at least partially, within the main memory 770 and/or within the processor 760 during execution thereof by the computer system 700, the main memory 770 and the processor 760 also constituting machine-readable media.

The software 724 may further be transmitted or received over a network 680 via the network interface device 790.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and a system for contextual recognition through screen-sharing have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for sharing a screen display of a first client machine, comprising:
   receiving a screen-sharing data stream communicated from the first client machine to a second client machine, wherein the data stream comprises real-time screen data configured to replicate the screen display of the first client machine on a screen of the second client machine during a screen-sharing session;
   recognizing characteristic data of a video stream included in the data stream communicated from the first client machine to the second client machine by performing optical character recognition (OCR) on the data stream;
   extracting the recognized characteristic data of the video stream-included in the data stream by performing screen scraping of the video stream;
   identifying, based on the extracted characteristic data, contextual data to add to the data stream;
   adding the contextual data with the data stream comprising embedding the contextual data within the data stream or providing the contextual data as a parallel data stream with the data stream; and
   communicating, in real time, to the second client machine, the data stream and the added contextual data,
   wherein the characteristic data at least characterizes an aspect of the video stream.

2. The method of claim 1, wherein the communicating the added contextual data and the data stream includes communicating the contextual data as a parallel data stream with the data stream.

3. The method of claim 1, wherein the communicating the added contextual data and the data stream includes embedding the contextual data within the data stream.

4. The method of claim 1, wherein the video stream is based on a video currently being displayed on a display device of the first client machine.

5. The method of claim 1, wherein the characteristic data includes at least one of a content data or metadata.

6. The method of claim 1, wherein extracting the characteristic data and adding the contextual data occurs at the first client machine.

7. The method of claim 1, wherein the recognizing of the characteristic data includes recognizing a keyword, the keyword to be used in identifying the contextual data.

8. The method of claim 7, wherein the contextual data includes an advertisement selected based on the keyword.

9. The method of claim 1, including receiving the data stream at a server.

10. The method of claim 9, including performing, at the server, at least one of extracting the recognized characteristic data or adding the contextual data.

11. The method of claim 1, wherein the communicating to the second client machine includes presenting a viewer screen at the second client machine, the viewer screen including the data stream and the added contextual data.

12. The method of claim 11, including, at the second client machine, receiving the data stream and performing at least one of extracting the characteristic data or adding the contextual data.

13. A system comprising:
   a server configured to receive, via a network, from a first client machine, a data stream including a display output from the first client machine to a second client machine, wherein the data stream comprises real-time screen data configured to replicate a screen display of the first client machine on a display of the second client machine during a screen-sharing session;
   a processor configured to:
   recognize characteristic data of the display output by performing optical character recognition (OCR) on the data stream;
   extract the recognized characteristic data of the display output included in the data stream by performing screen scraping of the display output;
   identify, based on the extracted characteristic data, contextual data to add to the data stream;
   add the contextual data with the data stream comprising embedding the contextual data within the data stream or providing the contextual data as a parallel data stream with the data stream; and
   communicate, to the second client machine, the data stream and the added contextual data in real time,
   wherein the characteristic data at least characterizes an aspect of the display output.

14. The system of claim 13, wherein the server is configured to receive from the first client machine the data stream including a video stream currently being displayed on a display device of the first client machine.

15. The system of claim 13, wherein the first client machine performs the extraction of recognized characteristic data and the adding of contextual data with the data stream.

16. The system of claim 13, wherein the processor is further configured to recognize the characteristic data including a keyword, the keyword for use in identifying the contextual data.

17. The system of claim 13, wherein the server includes the processor.

18. The system of claim 13, wherein the second client machine includes the processor.

19. The system of claim 13, wherein the processor is further configured to communicate the added contextual data and the data stream by communicating the contextual data as a parallel data stream with the data stream.

20. The system of claim 13, wherein the characteristic data includes at least one of content data or metadata.

21. A system comprising:
means for receiving, using at least one processor, from a first client machine, a data stream including display output communicated from the first client machine to a second client machine, wherein the data stream comprises real-time screen data configured to replicate a screen display of the first client machine on a display of the second client machine during a screen-sharing session;
means for recognizing, using the at least one processor, characteristic data of the display output included in the data stream communicated from the first client machine to the second client machine by performing optical character recognition (OCR) on the data stream;
means for extracting, using the at least one processor, the recognized characteristic data of the display output from the data stream by performing screen scraping of the display output;
means for identifying, using the at least one processor, based on the extracted characteristic data, contextual data to add to the data stream;
means for adding contextual data, using the at least one processor, with the data stream comprising embedding the contextual data within the data stream or providing the contextual data as a parallel data stream with the data stream; and
means for communicating, using the at least one processor, in real time, to the second client machine, the data stream and the added contextual data,
wherein the characteristic data at least characterizes an aspect of the display output.

22. A system comprising:
a machine-readable non-transitory storage medium comprising instructions, which when implemented by one or more processors perform the following operations:
receiving, from a first client machine, a data stream including a video stream communicated from the first client machine to a second client machine, wherein the data stream comprises real-time screen data configured to replicate a screen display of the first client machine on a display of the second client machine during a screen-sharing session;
recognizing characteristic data of a video stream included in the data stream communicated from the first client machine to the second client machine by performing optical character recognition (OCR) on the data stream;
extracting the recognized characteristic data of the video stream included in the data stream by performing screen scraping of the video stream;
identifying, based on the extracted characteristic data, contextual data to add to the data stream:
adding the contextual data with the data stream comprising embedding the contextual data within the data stream or providing the contextual data as a parallel data stream with the data stream; and
communicating, in real time, to the second client machine, the data stream and the added contextual data,
wherein the characteristic data at least characterizes an aspect of the video stream.

23. One or more machine-readable non-transitory storage medium comprising instructions, which when implemented by one or more processors, perform the following operations:
providing, at a first client machine, a data stream including a display output from the first client machine, wherein the data stream comprises real-time screen data configured to replicate a screen display of the first client machine on a display of a second client machine during a screen-sharing session;
at the first client machine, recognizing characteristic data of the display output included in the data stream communicated from the first client machine to the second client machine by performing optical character recognition (OCR) on the data stream;
at the first client machine, extracting the recognized characteristic data of the data stream by performing screen scraping of the display output;
at the first client machine, identifying, based on the extracted characteristic data, contextual data to add to the data stream;
at the first client machine, adding the contextual data with the data stream comprising embedding the contextual data into the data dream or providing the contextual data as a parallel data stream with the data stream; and
communicating from the first client machine, in real time, to the second client machine, the data stream and the added contextual data,
wherein the characteristic data at least characterizes an aspect of the screen display of the first client machine.

* * * * *